Patented Sept. 13, 1949

2,481,580

UNITED STATES PATENT OFFICE 2,481,580

MANUFACTURE OF ALIPHATIC DINITRILES

Henry Dreyfus, deceased, late of London, England, by Claude Bonard, administrator, London, England, assignor to Celanese Corporation of America, a corporation of Delaware No Drawing. Application October 3, 1945, Serial No. 620,183. In Great Britain June 7, 1944

Section 1, Public Law 690, August 8, 1946
Patent expires June 7, 1964

5 Claims. (Cl. 260—465.8)

This invention relates to the manufacture of aliphatic dinitriles.

According to the invention aliphatic dinitriles in which the nitrile groups are attached to adjacent carbon atoms are made by reaction between hydrogen cyanide, an alpha-beta olefinic nitrile, and a cyanide of an alkali metal or alkaline earth metal in amount between 0.1% and 5% of the molecular equivalent of the olefinic nitrile. Preferably the reaction mixture also contains a very small amount of a substance capable of inhibiting addition-polymerisation of olefinic compounds, for instance hydroquinone.

The invention is of particular importance in the manufacture of succinonitrile from acrylonitrile, but it can also be applied to the manufacture of other aliphatic dinitriles, especially the lower alkyl-substituted succinonitriles; for example methyl-succinonitrile can be made from methacrylonitrile or from crotononitrile.

The process of the invention is preferably carried out by mixing together the olefinic nitrile and liquid hydrogen cyanide, advantageously with a trace of the polymerisation-inhibitor, adding thereto a concentrated aqueous solution of the metal cyanide, and maintaining the reactants at a temperature of the order of 30° C. under atmospheric pressure until substantially all the olefinic nitrile has been converted into the corresponding dinitrile. The mixture preferably contains approximately equimolecular proportions of the olefinic nitrile and hydrogen cyanide or a small excess, for example an excess of up to 10%, of hydrogen cyanide. Thus succinonitrile may be made from a reaction mixture containing 2 parts by weight of acrylonitrile and 1 to 1.1 part of hydrogen cyanide. As the metal cyanide it is preferred to use sodium or potassium cyanide in amount between 0.2% and 2.5% of the equivalent of the olefinic nitrile. Thus for every 2 parts by weight of acrylonitrile the reaction mixture may contain between 0.004 and 0.045 part of sodium cyanide or between 0.005 and 0.06 part of potassium cyanide. When a polymerisation-inhibitor such as hydroquinone is used, it is sufficient to add to the reaction mixture only so much as is usually employed to stabilise olefinic compounds (e. g. vinyl compounds) against polymerisation.

The reaction is exothermic, and although it is advisable to heat the reactants initially to about the reaction temperature, once the reaction has started the heat evolved is sufficient not only to maintain the temperature but also to cause the hydrogen cyanide to boil under atmospheric pressure. Preferably therefore the reaction is carried out under a reflux condenser whereby the vaporized hydrogen cyanide is condensed and returned to the reaction mixture. If necessary the reaction mixture may be cooled by means of a cooling fluid, e. g. cold water or chilled brine, in order to prevent the hydrogen cyanide boiling too vigorously. Towards the end of the reaction, when little free hydrogen cyanide remains and the reaction is much less vigorous, the mixture may be heated in order to maintain the temperature, or it may be heated to a somewhat higher temperature, for example to 40° or 50° C.

If desired the reaction may be carried out under atmospheric pressure at a temperature below that at which the hydrogen cyanide boils from the mixture; in this case the temperature employed should be above 20° C., and is preferably above 25° C., and it is advantageous finally to heat the mixture to 40°–50° C. Furthermore the reaction may be carried out under a pressure higher than atmospheric, preferably at a temperature between 25° and 30° C.

The invention is illustrated by the following example:

Example 10.6 parts by weight of acrylonitrile, 5.4 parts of commercial anhydrous hydrogen cyanide and a trace of hydroquinone were introduced into a reaction vessel immersed in a bath through which cold or warm water could be caused to flow at will, and provided with a fractionating column surmounted by a dephlegmator cooled with solid carbon dioxide. The mixture was heated to about 30° C., and then 0.1 part of potassium cyanide in concentrated aqueous solution was added. Cold water was then passed through the bath at such a rate that the hydrogen cyanide was kept gently boiling, and when ebullition ceased the cold water was replaced by warm water so as to keep the temperature of the reactants at about 30° C. After 5 hours from the addition of the potassium cyanide the reaction was substantially complete. The contents of the reaction vessel were then subjected to fractional distillation from the vessel under a pressure of about 23 mm.; the fraction boiling under this pressure between 150° and 152° C. was substantially pure succinonitrile. The yield of succinonitrile was about 90% calculated on the acrylonitrile used.

Having described the invention, what is desired to be secured by Letters Patent is:

1. In a process for the manufacture of aliphatic dinitriles in which the nitrile groups are attached to adjacent carbon atoms, which comprises forming a mixture of substantially equimolecular proportions of an alpha-beta-olefinic nitrile and liquid hydrogen cyanide together with a cyanide of a metal selected from the group which consists of the alkali metals and alkaline earth metals in amount 0.1% to 5% of the molecular equivalent of the olefinic nitrile, the steps of warming the mixture under atmospheric pressure to a temperature below 30° C. at which reaction takes place and hydrogen cyanide is vaporized from the mixture, condensing the vaporized hydrogen cyanide and returning the condensate to the mixture.

2. In a process for the manufacture of succinonitrile, which comprises forming a mixture of substantially equimolecular proportions of acrylonitrile and liquid hydrogen cyanide together with a cyanide of a metal selected from the group which consists of the alkali metals and alkaline earth metals in amount 0.1% to 5% of the molecular equivalent of the olefinic nitrile, the steps of warming the mixture under atmospheric pressure to a temperature below 30° C. at which reaction takes place and hydrogen cyanide is vaporized from the mixture, condensing the vaporized hydrogen cyanide and returning the condensate to the mixture.

3. In a process for the manufacture of succinonitrile, which comprises forming a mixture of substantially equimolecular proportions of acrylonitrile and liquid hydrogen cyanide together with an alkali metal cyanide in amount 0.2% to 2.5% of the molecular equivalent of the olefinic nitrile, the steps of warming the mixture under atmospheric pressure to a temperature below 30° C. at which reaction takes place and hydrogen cyanide is vaporized from the mixture, condensing the vaporized hydrogen cyanide, returning the condensate to the mixture and, after the vaporization of hydrogen cyanide has substantially ceased, raising the temperature of the mixture to 40° to 50° C.

4. Process according to claim 1 wherein the mixture contains a substance capable of inhibiting addition-polymerization of olefinic compounds.

5. Process according to claim 3 wherein the mixture contains a substance capable of inhibiting addition-polymerization of olefinic compounds.

CLAUDE BONARD,
*Administrator of the Estate of the said Henry Dreyfus.*

REFERENCES CITED

The following references are of record in the file of this patent:

UNITED STATES PATENTS

| Number | Name | Date |
|---|---|---|
| 2,166,600 | Leupold et al. | June 18, 1939 |
| 2,397,341 | Ellingboe | Mar. 26, 1946 |
| 2,434,606 | Carpenter | Jan. 13, 1948 |

OTHER REFERENCES

Comanducci, Chem. Abstracts, vol. 6, page 3092 (1912).

Wieland et al.: Derichte (Deutsch. Chem. Gesell.), vol. 63B, p. 405.